United States Patent
Park et al.

(10) Patent No.: US 9,377,893 B2
(45) Date of Patent: Jun. 28, 2016

(54) TOUCHSCREEN DEVICE WITH GRIP SENSOR AND CONTROL METHODS THEREOF

(71) Applicant: Samsung Electronics Co., Ltd., Gyeonggi-do (KR)

(72) Inventors: Jeong-Min Park, Gyeonggi-do (KR); Jae-Woong Chun, Gyeonggi-do (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 0 days.

(21) Appl. No.: 14/071,068

(22) Filed: Nov. 4, 2013

(65) Prior Publication Data

US 2014/0125612 A1    May 8, 2014

(30) Foreign Application Priority Data

Nov. 2, 2012  (KR) .......................... 10-2012-0123604

(51) Int. Cl.
*G06F 3/041* (2006.01)
*G06F 3/038* (2013.01)
*G06F 3/0354* (2013.01)

(52) U.S. Cl.
CPC .............. *G06F 3/0416* (2013.01); *G06F 3/038* (2013.01); *G06F 3/03545* (2013.01); *G06F 2203/0339* (2013.01)

(58) Field of Classification Search
CPC ..................... G06F 3/0488; G06F 3/044–3/045

USPC ................................................... 345/156–178
See application file for complete search history.

(56) References Cited

U.S. PATENT DOCUMENTS

| | | | |
|---|---|---|---|
| 7,656,393 B2 | 2/2010 | King et al. | |
| 8,719,719 B2* | 5/2014 | Cohen et al. | 715/764 |
| 2009/0174679 A1* | 7/2009 | Westerman | G06F 3/03547 345/173 |
| 2009/0184935 A1* | 7/2009 | Kim | G06F 3/0488 345/173 |
| 2011/0285645 A1* | 11/2011 | Cho | G06F 3/0416 345/173 |
| 2012/0075212 A1* | 3/2012 | Park et al. | 345/173 |
| 2012/0262407 A1* | 10/2012 | Hinckley et al. | 345/173 |

FOREIGN PATENT DOCUMENTS

KR  10-2011-0127555 A  11/2005

\* cited by examiner

*Primary Examiner* — Kent Chang
*Assistant Examiner* — Nathan Brittingham
(74) *Attorney, Agent, or Firm* — Cha & Reiter, LLC (57) ABSTRACT

Apparatus and methods for controlling operations of a touchscreen terminal having grip sensors are disclosed. A grip signal is detected when the terminal is gripped. A touch-inactive area is established in the touchscreen area based at least upon the grip signal. Touches occurring within the touch-inactive area are designated as non-executable gripping touches. Accordingly, unintentional touch executions due to an overlapping grip are prevented.

18 Claims, 7 Drawing Sheets

TOUCHSCREEN DEVICE WITH GRIP SENSOR AND CONTROL METHODS THEREOF

CLAIM OF PRIORITY

This application claims the benefit under 35 U.S.C. §119 (a) of a Korean Patent Application field in the Korean Intellectual Property Office on Nov. 2, 2012, and assigned Serial No. 10-2012-0123604, the entire disclosure of which is incorporated herein by reference.

BACKGROUND

1. Technical Field

The present disclosure relates generally to touchscreen electronic devices, and more particularly, to controlling operations of a touchscreen terminal equipped with a grip sensor.

2. Description of the Related Art

Some recent designs of handheld touchscreen terminals such as smart phones and tablet PCs have been equipped with a grip sensor which is used to determine the grip status of the terminal. The grip sensor is typically a pressure sensor disposed on the lateral side portions of the terminal. When it is determined via a grip status signal that the user is gripping the terminal, certain functions of the terminal may be automatically modified. For instance, the user's grip may be known to alter antenna performance in a predetermined manner. Hence an antenna matching circuit or antenna element switching circuit may be automatically varied when the grip signal is detected, to optimize antenna performance. In another example, when a user's grip is detected, it is generally more likely that the user is actively using the terminal. A sleep mode function in which the display is turned off after no touch is detected for a preset time, may thus be modified or suspended when the grip signal is detected.

When a user grips a touchscreen terminal with a grip sensor, the user's finger or hand may make an unintentional touch on the terminal's touchscreen. To solve this problem, terminals have been provided with a bezel, i.e., a frame area surrounding the touchscreen. With the bezel, the terminal may protect the touchscreen against the unintentional touch when gripped by the user, because the user's finger does not reach over the bezel.

However, by including the bezel, the size of the terminal becomes unnecessarily large while an area of the touchscreen becomes relatively small.

SUMMARY

Provided are apparatus and methods for controlling operations of a touchscreen terminal having grip sensors. A grip signal is detected when the terminal is gripped. A touch-inactive area is established in the touchscreen area based at least upon the grip signal. Touches occurring within the touch-inactive area are designated as non-executable gripping touches. Accordingly, unintentional touch executions due to an overlapping grip are prevented.

Touches outside the touch-inactive area are treated as normal, executable touch inputs. The touch-inactive area may be established adjacent a grip area at which a grip sensor detects the grip has occurred.

Since touch errors due to an overlapping grip are prevented, embodiments enable a bezel of the terminal, which is otherwise included to prevent unintentional touches, to be reduced in size or eliminated, whereby a touchscreen can be made larger for a terminal of a given form factor.

BRIEF DESCRIPTION OF THE DRAWINGS

The above and other features and advantages of the present invention will become more apparent in light of the following detailed description of exemplary embodiments thereof with reference to the attached drawings in which.

DETAILED DESCRIPTION

Reference will now be made in detail to embodiments, examples of which are illustrated in the accompanying drawings, wherein like reference numerals refer to the like elements throughout.

In embodiments of the present invention, a portable terminal is a mobile electronic device that is easily carried by humans, such as by a single hand. Examples of portable terminals include smart phones, tablet PCs, touchscreen game devices or music players, video phones, cell phones, International Mobile Telecommunication-2000 (IM-2000) terminals, Wideband Code Division Multiple Access (WCDMA) terminals, Universal Mobile Telecommunication Service (UMTS) terminals, Personal Digital Assistants (PDAs), Portable Multimedia Players (PMPs), Digital Multimedia Broadcasting (DMB) terminals, E-Books, portable computers (e.g., laptops) and touchscreen digital cameras.

Herein, a portable terminal will be interchangeably called a "terminal", for brevity.

Embodiments of the present invention may also have applicability to certain fixed terminals, which are electronic devices that are not readily transportable in normal use, such as a smart touchscreen device mounted to a large appliance (e.g., a refrigerator), or a touchscreen device used in connection with a desktop PC.

As used in this document, including the Claims section, the words "a" or "an" mean one or more than one. The term "plurality" means two or more than two. The term "another" is defined as a second or more. The words "comprising", "including", "having" and the like are open ended. Reference herein to "one embodiment", "embodiments", "an embodiment" or similar term means that a particular feature, structure, or characteristic described in connection with the embodiment is included in at least one embodiment. The appearances of such phrases in various places throughout this disclosure are not necessarily all referring to the same embodiment. Furthermore, the particular features, structures, or characteristics may be combined in any suitable manner on one or more embodiments without limitation. The terms "may" or "can" are used herein to refer to at least an optional element, feature, function, characteristic, advantage, etc., of a described embodiment. The word "unit" means "component", "part" or "device".

In accordance with embodiments of the invention, at least one "touch-inactive" area is defined on outer portions of a terminal's touchscreen, in accordance with sensing a user's grip on the terminal. The touch-inactive area may be established adjacent to positions at which the grip is sensed on sides of the terminal. Dimensions of the touch-inactive area may be dynamically defined and adjusted in accordance with detected grip locations. While the grip positions are maintained, when touches are detected in the touch-inactive area, these are recognized as unintentional touches, rather than touches for inputting commands. In areas of the touchscreen outside the touch-inactive area, touches are recognized as normal touch inputs. When the user's grip is subsequently released, the touch-inactive area may immediately revert back to a normal touchscreen area for receiving touch input commands.

Figure 1:
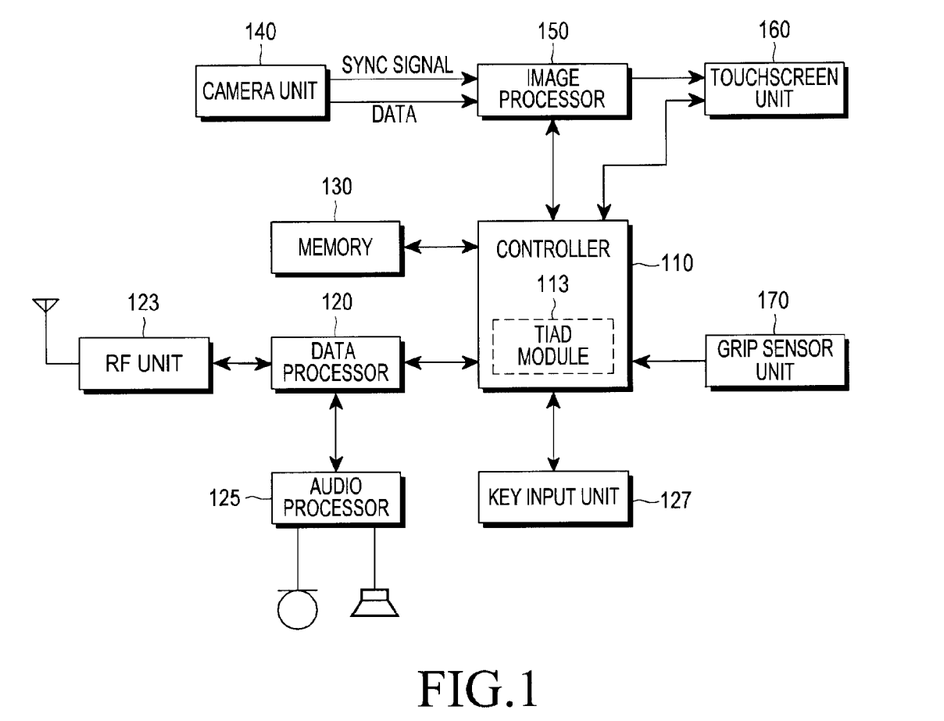
FIG. 1 is a block diagram of a terminal, according to an embodiment of the present invention.
Figure 2A:
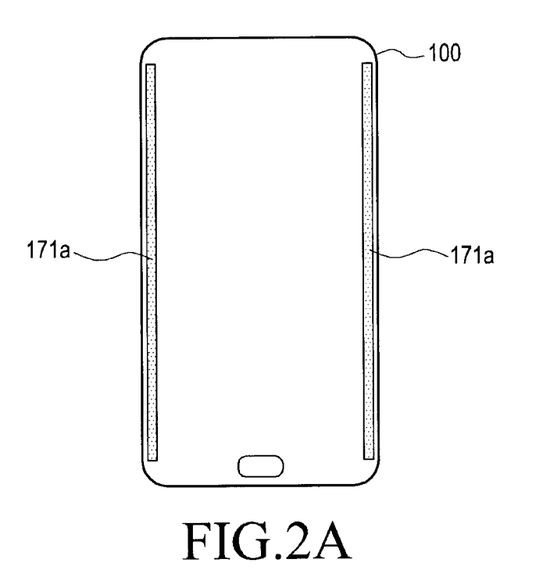
FIGS. 2A and 2B illustrate terminals with grip sensors equipped on both sides, according to embodiments of the present invention.
Figure 2B:
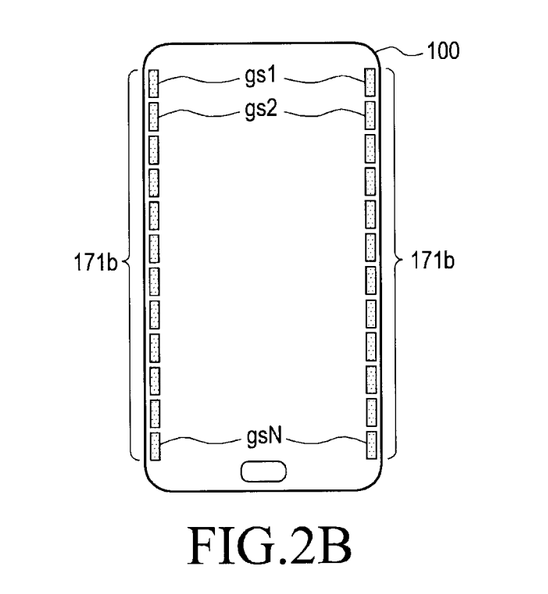

FIG. 1 is a block diagram of an exemplary terminal, 100, according to an embodiment of the present invention. FIGS. 2A and 2B illustrate respective embodiments of terminals with grip sensors equipped on both sides.

In the following description, the term "grip sensor region" denotes a peripheral region of the terminal at which grip sensors are disposed, whereby a user's grip may be detectable anywhere within a grip sensor region. The terms "grip area", "detected grip area" or "sensed grip area" denote a portion of a grip sensor region at which a user's grip is currently detected. An "unused grip sensor region" denotes a portion of a grip sensor region at which a user's grip is not currently detected. The terms "gripping touch" or "grip touch" are used herein to refer to a perceived unintentional touch due to a user's grip on the side of the terminal.

Referring to FIG. 1, a radio frequency (RF) unit 123 performs a wireless communication function of terminal 100 (hereafter, "the terminal"). The RF unit 123 includes an RF transmitter for up converting a frequency of a transmit signal and amplifying the transmit signal and an RF receiver for low-noise amplifying a received signal and down converting the frequency of the received signal. A data processor 120 encodes and modulates the transmit signal, and demodulates and decodes the received signal. The data processor 120 may be composed of a modem and a codec. The codec includes a data codec for processing e.g., packet data and an audio codec for processing an audio signal, such as a voice signal. An audio processor 125 plays a received audio signal output from the audio codec of the data processor 120, or transmits an audio signal generated by the microphone to the audio codec of the data processor 120.

A key input unit 127 may be provided, which includes alphanumeric keys with which to input number and character information, and function keys with which to set various functions.

A memory 130 may contain program and data memories. The program memory may store programs for controlling general operations of the terminal, and programs to control establishing a touch-inactive area on the touchscreen in accordance with embodiments of the invention, where touches therein are assumed to result from the user gripping the terminal, as opposed to active touch inputs. Also, the data memory temporarily stores data generated in the course of running the programs.

The controller 110 controls the general operations of the terminal.

In addition, controller 110 may include a Touch Inactive Area Determinator (TIAD) module 113 to dynamically determine touch-inactive areas of a touchscreen in accordance with embodiments described herein. Alternatively, TIAD module 113 may be provided as a separate module operatively coupled to controller 110.

Upon detection of at least grip signals provided by a grip sensor unit 170, the controller 110 using TIAD module 113 sets up a touch-inactive area adjacent a grip area corresponding to the grip signals, and determines that a subsequent or concurrent touch signal generated in the touch-inactive area results from a user's grip. (In some embodiments, discussed below, the controller waits until a touch signal is input before setting up the touch-inactive area.) As a result, touches detected in the touch-inactive area are not recognized as input commands. However, the controller 110 recognizes touch signals generated in areas other than the touch-inactive area of the touchscreen unit 160 as normal touch inputs.

Also, upon detection of a touch signal through the touchscreen unit 160 while a plurality of grip signals are detected with the grip sensor unit 170, the controller 110 sets up a plurality of touch-inactive areas (or a single, elongated touch-inactive area) adjacent to respective grip areas where the plurality of grip signals are detected.

Upon detection of the grip area, the controller 110 determines a vertical length h of the grip area, establishes a horizontal length t of the grip area (which may be variable and may be a function of the vertical length h), and establishes the touch-inactive area having the vertical length h and the horizontal length t. The horizontal length t is set up to have a default value which may be adjustably increased or decreased according to the vertical length h, i.e., as a function of the vertical length h. Since some fingers of a user gripping the terminal may reach over the grip area and make touches on the touchscreen 160, the vertical length h may be increased upwards or downwards beyond the predetermined default value.

In a typical configuration according to some embodiments, the longer the length h, the wider the distance t, i.e., t is linearly or nonlinearly proportional to h. Preset values for t can be established, e.g., by experimentation for particular device models, or by "learning" performed by each individual device. Such learning can be accomplished, e.g., in a settings mode, which may include the use of prompts to request the user to grip the device in a typical manner. Once gripped in the setting mode in response to the prompt, the controller may sense the precise positions at which the user's particular grip touches the outer portions of the screen, and may establish criteria for setting a values for t accordingly (e.g., as a function of h).

Alternatively or additionally, a program for learning of this sort may be executed by the controller dynamically, during times at which the user is operating the terminal with touch inputs. For instance, the controller may be configured to sense touched areas that include outermost edge points of the screen. These areas may be in the geometric shape of a minor segment of a circle, indicative of fingers overlapping a side portion of the screen. When such geometrical shapes including the outermost edge points are detected in the vicinity of detected grip locations, the controller may apply such area information in a dynamic calculation for touch-inactive area dimensions, and re-set the current touch-inactive area accordingly.

As just discussed, the touch-inactive area of the touchscreen unit 160 is established to be adjacent to the grip area where the grip signal is detected. Preferably, the grip sensor unit 170 is equipped on both sides of the terminal, i.e., left and right sides in a normal viewing position. In this case, the grip area is on detected grip portions of at least one of the left and right sides of the terminal and the touch-inactive area may be established adjacent to the grip area in the touch screen unit 160. In some embodiments, a grip can be sensed on top or bottom sides of the terminal as well, which is particularly useful for establishing a touch-inactive area when the terminal is rotated by 90 degrees (where the controller is designed to automatically rotate text by 90 degrees correspondingly). In some embodiments, a grip sensor is on the rear portion of the terminal.

In embodiments, if no grip is sensed at a particular portion of a grip sensor region, a touch-inactive area may not be established adjacent to that portion. In this case, touch input sensed adjacent to that portion will be treated as a normal touch input.

While detecting a grip signal received from the grip sensor unit 170, if coordinates of a touch signal are contained in the touch-inactive area, the controller 110 determines that the touch signal results from a grip, and thus ignores the touch signal—i.e., it does not apply the touch signal for executing a function.

While detecting a grip signal received from the grip sensor unit 170, if coordinates of a touch signal are contained in an area other than the touch-inactive area, the controller 110 determines that the touch signal results from a normal touch input.

In embodiments, controller 110 also determines a grip area where the grip signal is detected when detecting "multi touch" signals from the touchscreen unit 160 while detecting a grip signal received from the grip sensor unit 170. Here, "multi touch" refers to multiple, distinguishable regions of the touchscreen being simultaneously touched, e.g., by different fingers of a user.

While detecting a grip signal received from the grip sensor unit 170, if coordinates of multi touch signals are contained in the touch-inactive area and in the area other than the touch-inactive area, the controller 110 determines that one of the multi touch signals that has coordinates in the touch-inactive area results from a gripping gesture. If the detected multi touch signals have coordinates in the touch-inactive area, the controller 110 determines that the multi touch signals result from a user's grip.

In an alternative embodiment, when a touch is made by the user in gripping the terminal, i.e., when an unintentional touch on the touchscreen is made by the user who intends only to grip the terminal, the touch-inactive area may thereafter be established adjacent to the grip area of the touchscreen unit 160. To this end, attributes of a touch adjacent to the grip area may be analyzed by the controller, to distinguish between intentional and unintentional touches. If a sensed touch area does not include any outermost points of touchscreen, it may be automatically recognized as intentional. However, if the touch area does include outermost points adjacent to a detected grip area, it may be automatically recognized as an unintentional gripping touch. Other criteria can be optionally used, e.g., if a touch shape resembles a user's finger or hand overlapping the edge of the terminal, it may be automatically recognized as unintentional. For instance, the overlapping condition may be recognized as a touch in the shape of a minor segment of a circle with the flat portion at the edge of the touchscreen.

A camera unit 140 capturing an image includes a camera sensor for converting the captured image to analog electric signals, and a signal processor for converting analog electric signals to digital image data. The camera sensor can be a charge-coupled device (CCD) or a complementary metal-oxide semiconductor (CMOS), and the signal processor may be implemented with a digital signal processor (DSP). The camera sensor and the signal processor may be integrated together, or may be implemented separately.

An image processor 150 performs image signal processing (ISP) for displaying image data output by the camera unit 140 in the touchscreen unit 160, and the ISP performs gamma correction, interpolation, spatial change, image effect, image scale, AWB, AE, AF, and the like. The image processor 150 processes the image data in the frame unit and outputs image frame data to a size and characteristics of the touch screen unit 160. The image processor 150 also includes an image codec for compressing the image frame data to be displayed in the touchscreen unit 160 in a predetermined compression method or for decompressing the pressed frame image data. The image codec may be a Joint Photographic Experts Group (JPEG) codec, a Moving Picture Experts Group (MPEG) 4 codec, or the like. The image processor 150 is assumed herein to have an on screen display (OSD) function, and may output OSD data to a displayed screen size under control of the controller 110.

The touchscreen unit 160 displays the image frame data output by the image processor 150 on a display screen (herein, "screen", interchangeably) and displays user data output by the controller 110. The touchscreen unit 160 may use a liquid crystal display (LCD), in which case the touchscreen unit 160 may include an LCD controller, a memory for storing the image frame data, and an LDC display device. An LCD of the touchscreen unit 160 may serve as an input unit, in which case keys like the key input unit 127 may be displayed in the touchscreen unit 160.

As the touchscreen unit 160 is implemented as the touchscreen, the touchscreen unit 160 may be comprised of touchscreen panels (TSPs) having a plurality of sensor panels. The sensor panels may include a capacitive sensor panels that may recognize human being's touches and an electromagnetic sensor panels that may detect finer touches, e.g., which is made by a touch pen.

The touchscreen unit 160 includes the touch-inactive area, when defined by the controller responsive to grip signals, where touch inputs may be sensed but ignored for executing input commands that they would otherwise execute. In an area outside the touch-inactive area, touch inputs are recognized as normal touch inputs for executing commands.

The touch-inactive area established in the touchscreen unit 160 may have any predetermined or dynamically determined shapes, such as rectangles, squares, circles, ovals, fan-shapes, or finger-shapes.

The grip sensor unit 170 for providing the controller 110 with the grip signal detected when the user grips the terminal may be equipped on at least one of both sides, upper and lower sides, and a rear side of the terminal. For example, in an embodiment in which a grip sensor is provided only on the rear side, if a grip is detected, then touch inactive areas may be automatically set up along entire left and right sides of the terminal (Herein, the left and right sides may be the shorter sides, the longer sides, or both, of a rectangular terminal, depending on whether the user has rotated the terminal 90 degrees.) Alternatively, the touch inactive areas are subsequently set up after a touch resembling an overlapping finger or hand is detected.

In an illustrative embodiment, the grip sensor unit 170 is equipped on at least left and right sides of a generally rectangular terminal, as shown in FIGS. 2A and 2B. Although not shown, a portion of the grip sensor unit 170 may be disposed at top and bottom portions of the terminal as well (along the shorter sides of the terminal) such that when the terminal is rotated 90 degrees for operational use, a user's grip on the shorter sides are detectable as well. For a square terminal, grip sensors may be provided on all four sides of the terminal.

Referring to FIG. 2A, the grip sensor unit 170 may include a continuous grip sensor module 171a on both sides of the terminal. Alternatively, as shown in FIG. 2B, grip sensor unit 170 includes a grip sensor module 171b on left and right sides of the terminal, where grip sensor module 171b is comprised of a plurality of grip sensor elements such as gs1, gs2 . . . gsN. Grip sensor module 170 may be located adjacent the edges of touchscreen unit 160, or beneath the side portions of the touchscreen.

The grip sensor unit 170 may also include suitable means to determine where, what extent, and what distribution the grip has been made by detecting the grip signal in an area rather than only at a single point in the uniform grip sensor module 171a.

In the case of FIG. 2A, when the terminal is gripped, the grip sensor unit 170 extracts the information about the grip area where the grip has been made using grip sensor module 171a and provides the grip signal including the information about the grip area to the controller 110. In the information about the grip area, the grip area may be discerned by the grip sensor unit 170 to be a position of the grip sensor module 171a where sensed grip pressure is greater than a certain threshold. This position information may be received from a separate sensor. Alternatively, controller 110 determines the grip areas based on the signals provided by the grip sensor modules.

In the case of FIG. 2B, when the terminal is gripped, the grip sensor unit 170 extracts the information about the grip area from position information of the grip sensor elements such as gs1, gs2 . . . gsN located where the grip is made, and provides the grip signal including the information about the grip area to the controller 110. Alternatively, controller 110 determines the grip areas based on the signals provided by the grip sensor modules.

The grip sensor module such as shown in FIG. 2b is more suitable for the embodiment of the present invention.

Exemplary operations of controlling touches of the terminal 100 will be now described in detail in connection with FIGS. 3 to 5(A to G).

Figure 3:
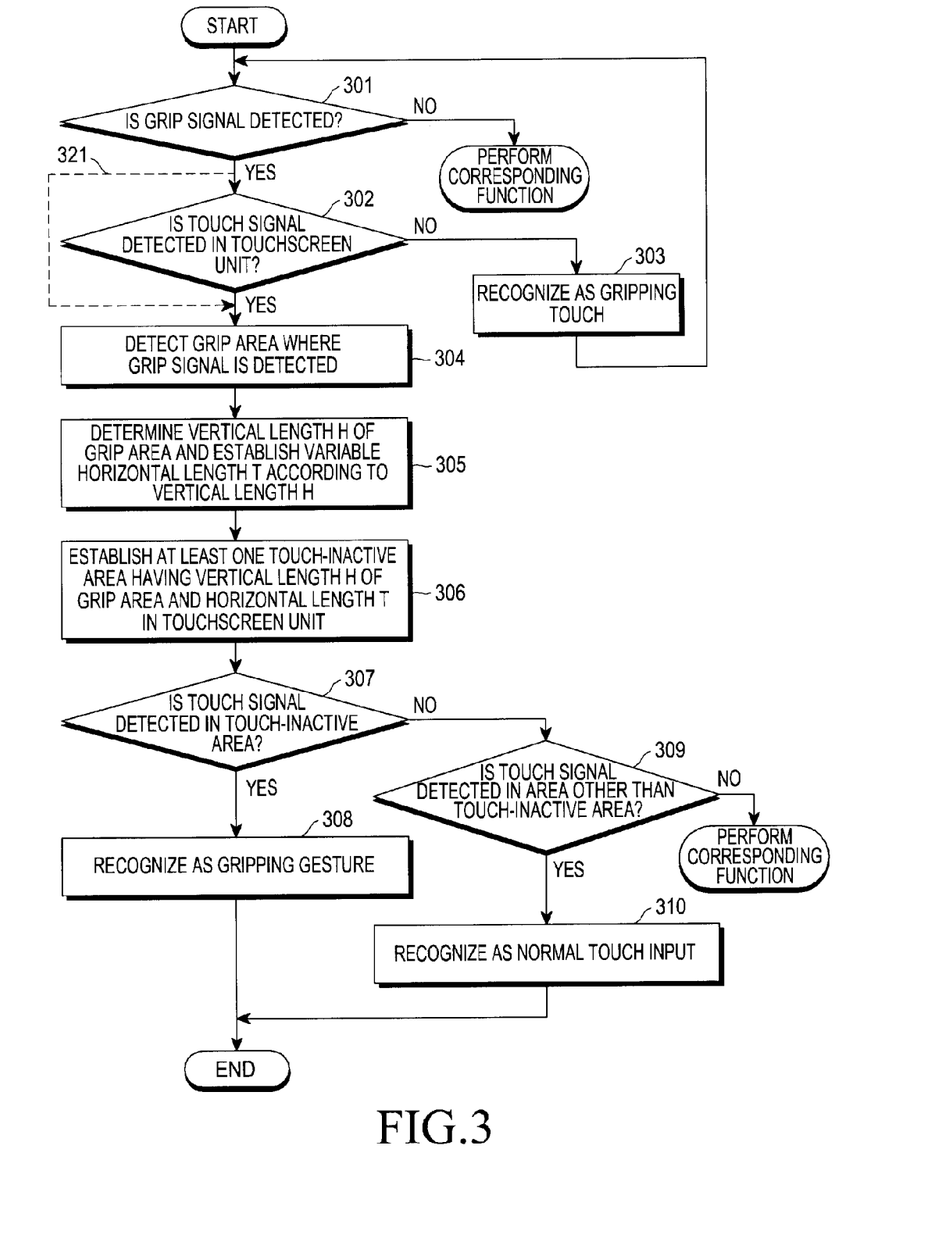
FIG. 3 is a flowchart illustrating example methods of controlling touch operations of a terminal according to embodiments of the present invention.

FIG. 3 is a flowchart illustrating example methods of controlling touch operations of a terminal, according to embodiments of the present invention. These embodiments will be described in conjunction with FIGS. 1 and 2.

At step 301, controller 110 receives from the grip sensor unit 170 a grip signal generated when the terminal is gripped. In a first implementation, represented by steps 302 and 303, if there is no touch signal detected while detecting the grip signal in step 302, it is determined that the grip signal results from a gripping touch in step 303. That is, no touch inactive area is generated at this time, and the flow returns to step 301.

In an alternative (second) implementation, indicated by path 321, as soon as the grip signal is detected at step 301, the flow proceeds to step 304, where controller 110 determines a grip area corresponding to the grip signal.

In the first implementation, if there is a touch signal detected from the touchscreen unit 160 while detecting the grip signal in step 302, the flow proceeds to step 304 where the same operation as above is performed.

From the grip area determined in step 304, the controller 110 determines a vertical length h of the grip area and a horizontal length t as described above, in step 305. The horizontal length t is set up to have a default value which may be adjustably increased or decreased in the manner described earlier. Controller 110 establishes a touch-inactive area having the vertical length h and the horizontal length t in the touchscreen unit 160, in step 306.

In the case where the grip sensor unit 170 is equipped on both sides of the terminal, the grip area may be on the both sides of the terminal and thus, the touch-inactive area may be established adjacent to the both sides of the terminal in the touchscreen unit 160.

After setting up the touch-inactive area in the touchscreen unit 160, the controller 110 determines if coordinates of the touch signal (newly detected in the case of the first implementation, or detected in step 302 in the case of the second implementation) are included in the touch-inactive area, in step 307. If so, controller 110 determines that the touch signal is unintentional and results from the user's grip, in step 308. Otherwise, the touch is detected in the area other than the touch-inactive area, in step 309. In this case, the touch signal is recognized as intentional resulting from a normal touch input command, and a corresponding operation is performed, in step 310.

In the above description of the method of FIG. 3, only a single touch-inactive area has been described; however a plurality of touch-inactive areas may also be established. If a plurality of grip signals through the grip sensor unit 170 are detected, corresponding to different grip locations, the controller 110 may establish a plurality of touch-inactive areas adjacent to respective grip areas where the plurality of grip signals are detected in the touchscreen unit 160.

Figure 4A:
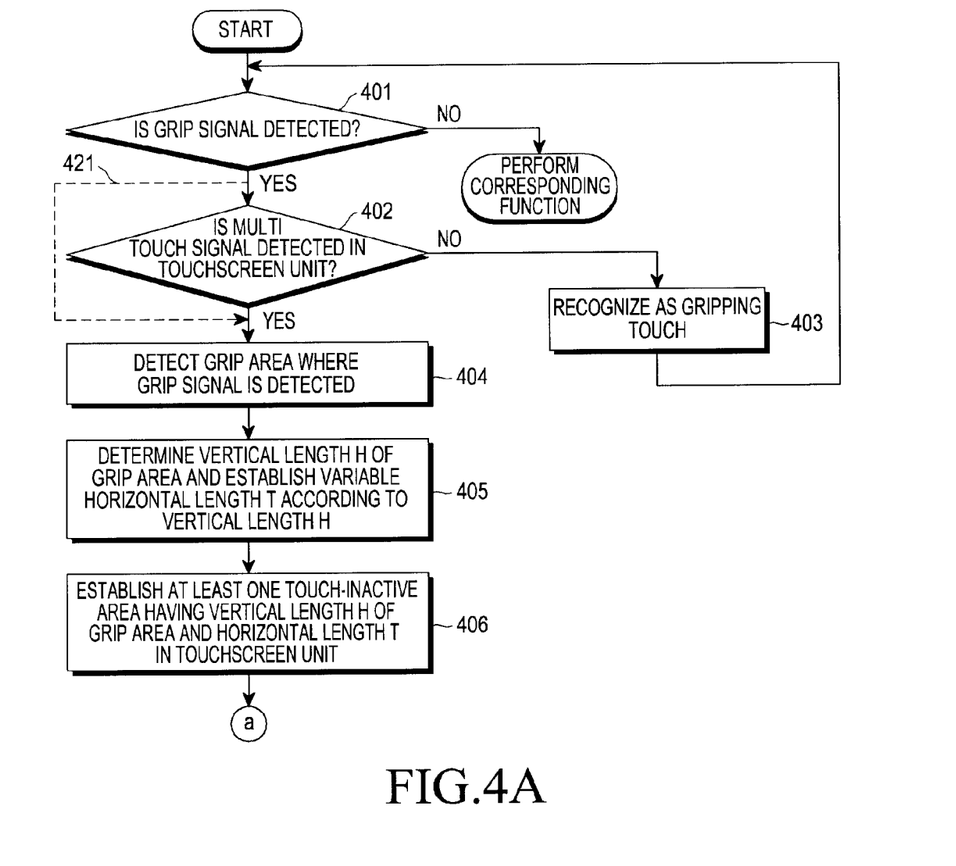
FIGS. 4A and 4B portions of a common flowchart illustrating methods of controlling touch operations of a terminal according to embodiments of the present invention.
Figure 4B:
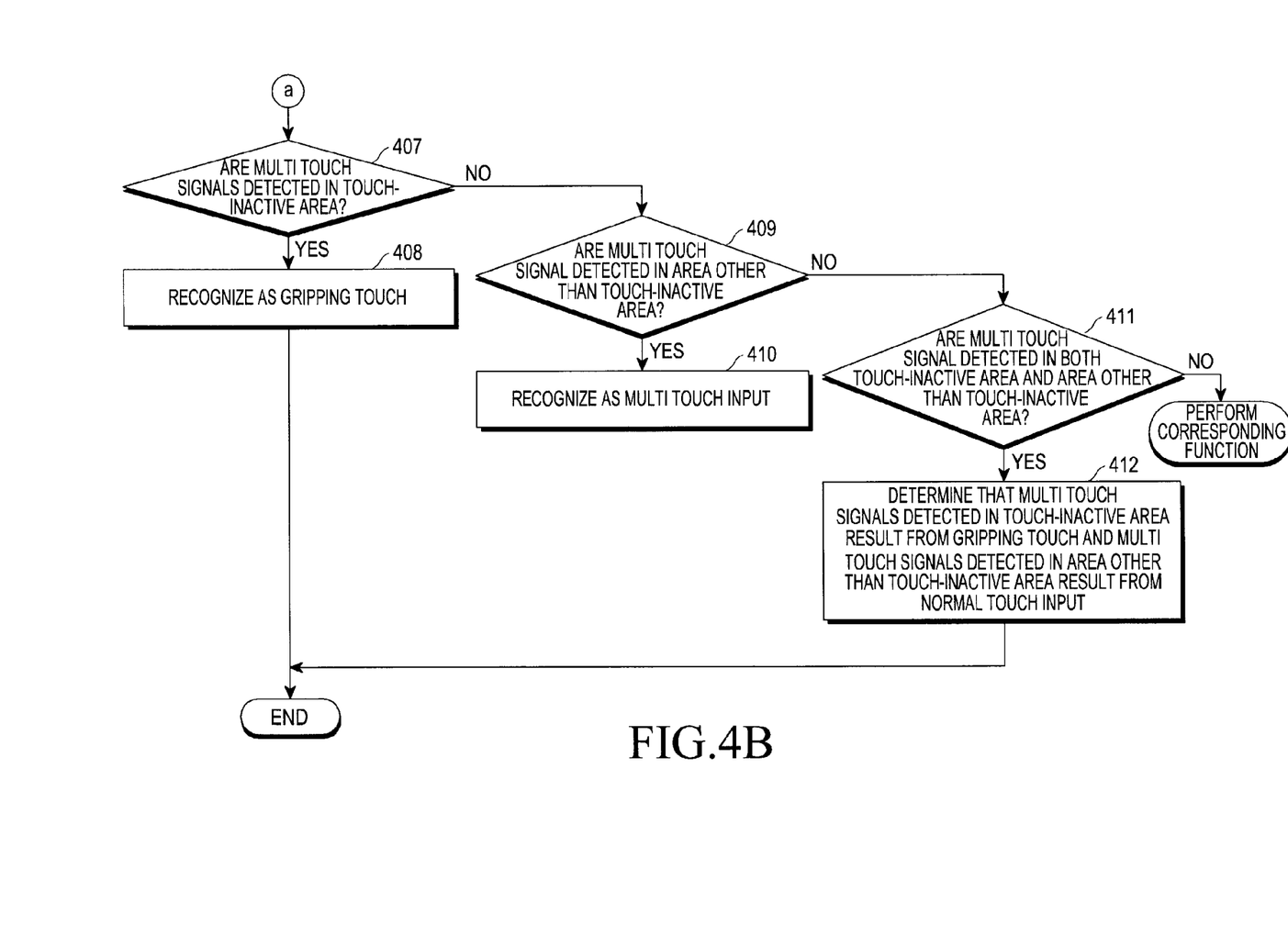

FIGS. 4A and 4B are portions of a common flowchart illustrating example methods of controlling touch operations of a terminal according to embodiments of the present invention. These methods will be described in conjunction with FIGS. 1 and 2A, 2B.

At step 401, controller 110 detects through the grip sensor unit 170 a grip signal generated when the terminal is gripped. In a third implementation, represented by steps 402 and 403, if there is no touch signal detected while detecting the grip signal in step 402, a gripping touch is merely recognized in step 403, and the flow returns to step 401. That is, no touch inactive area is generated at this time.

In an alternative (fourth) implementation, indicated by path 421, as soon as the grip signal is detected at step 301, the flow proceeds to step 404, where controller 110 determines a grip area(s) corresponding to the grip signal(s).

In the third implementation, if there are multi touch signals detected from the touchscreen unit 160 while detecting the grip signal in step 402, the flow proceeds to step 404 where the same operation as above is performed.

From the grip area determined in step 404, the controller 110 determines a vertical length h of the grip area(s) and establishes a horizontal length t in the manner described earlier, in step 405. The controller 110 establishes at least one touch-inactive area having the vertical length h and the horizontal length t in the touchscreen unit 160, in step 406. The touch-inactive area may be established adjacent to the both sides of the terminal in the touchscreen unit 160, adjacent to respective grip areas detected.

After setting up the touch-inactive area in the touchscreen unit 160, the controller 110 determines if coordinates of the multi touch signals detected in step 402 are included in the touch-inactive area, in step 407. If so, controller 110 determines that the multi touch signals are unintentional resulting from a user's grip, in step 408. Otherwise, if determining in step 409 that all the coordinates of the multi touch signals are included in the area other than the touch-inactive area in the touchscreen unit 160, the controller 110 determines that the multi touch signals are intentional resulting from a normal touch input and performs a corresponding operation, in step 410.

If determining that the multi touch signals detected in step 402 are included in both the touch-inactive area and the area other than the touch-inactive area, in step 411, the controller 110 determines that the multi touch signals having coordinates in the touch-inactive area result from a gripping touch, and that others having coordinates in areas outside the touch-inactive area result from a normal touch input, in step 412. Note that in the methods of FIG. 4, only a single touch-inactive area, or a plurality of touch-inactive areas, can be established, depending on how many corresponding grip areas are detected.

FIGS. 5A to 5G illustrate terminals and screen examples for explaining embodiments in connection with FIGS. 3, 4A and 4B. In FIGS. 5B-5G, each touch-inactive area 161a, 162a, etc. is shown to have a vertical dimension h and horizontal dimension t. The values of t and h can be different in each of these figures. In particular, the value of h may be set corresponding to the detected grip area, and the value of t may be set either as a default value which is the same in all cases, or as a function of the h value. The t value may also be set in each case as a function of an actual overlapping touch detected, e.g., beginning from edge points detected in a grip area and extending as minor segments of a circle.

Figure 5A:
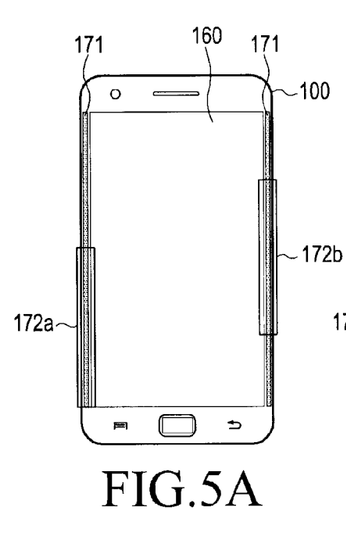
FIGS. 5A, 5B, 5C, 5D, 5E, 5F and 5G illustrate terminals and screens, and operations thereof for explaining embodiments in connection with FIGS. 3, 4A and 4B.

Referring to FIG. 5A, example grip areas 172a and 172b correspond to detected grip locations detected with the grip sensor module 171 (e.g., modules 171a or 171b of FIGS. 2A, 2B) equipped on either side of the terminal. In accordance with the first or third implementations above (steps 303 or 403), only gripping gestures are recognized, and no touch inactive areas are established at this point. Alternatively, in accordance with the second or fourth implementations above (paths 321 or 421), touch-inactive areas (not shown) would be established adjacent to grip areas 172a and 172b.

Figures 5B, 5C:
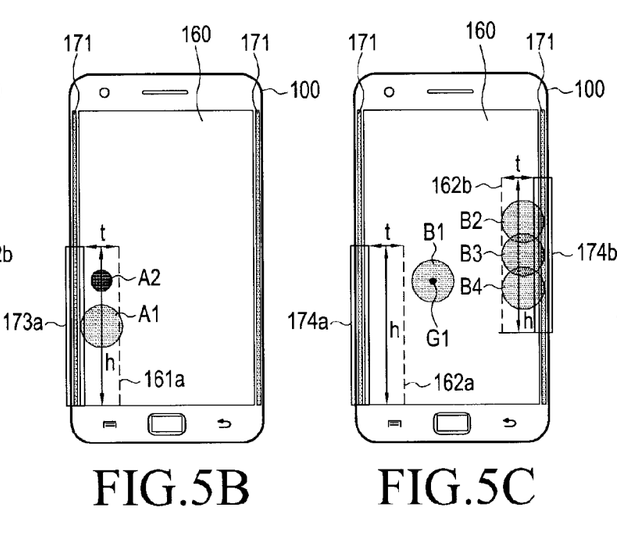

Referring to FIG. 5B, while a grip area 173a is detected from the grip signals of grip sensor module 171 as the terminal is gripped, if a touch A1 having a touch area whose coordinates are included in a touch-inactive area 161a established adjacent to the grip area 173a is detected, it is determined that the touch A1 results from the user's grip. Consequently, the signal of touch A1 is not used to execute any function of terminal 100.

It is noted, that the area of touch A1 may be analyzed in a number of ways. In one method, an averaging approach is taken, in which the touch is assumed to take place at an average point, e.g. a center of gravity, of the touch area. With this approach, if the average point lies within the touch inactive area, the touch is recognized as a grip touch and not used for executing commands. In another approach, if any point of the touch area lies outside the touch inactive area, the touch is considered a normal touch. In yet another approach, mentioned earlier herein, if the touch A1 is considered overlapping the edge of the touchscreen adjacent a grip area, the touch A1 can be considered a grip touch. For instance, if the touch area includes points that are on the outermost edge of the touchscreen adjacent the grip area, the touch A1 is considered an overlapping grip touch. Other criteria such as the shape of the touch area may also be considered in connection with the overlapping determination. As an example, in an illustrated touch A2, no edge portion of the touch screen is included in the touch area; thus touch A2 may be recognized as a normal touch whereby a corresponding function is executed, despite being wholly within the touch-inactive area 161a.

Referring to FIG. 5C, while the grip area 174a or 174b is being detected from the grip sensor module 171 multi touch signals B1 to B4 are detected. It is determined that the touch signal B1 whose coordinates are outside the touch-inactive areas 162a and 162b established adjacent to the respective grip areas 174a and 174b; thus the touch is recognized as a normal input touch. It is also determined that the touch signals B2 to B4 whose coordinates are included in the touch-inactive area 162b result from a gripping touch.

Figure 5D:
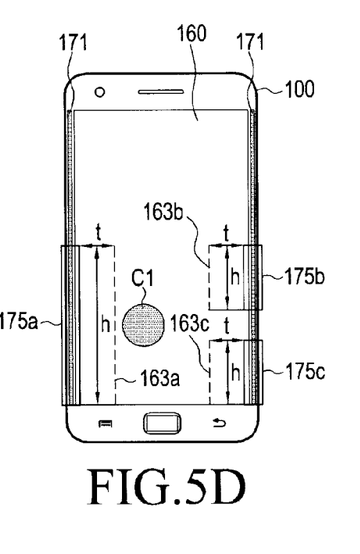

Referring to FIG. 5D, while the grip areas 175a to 175c are being detected from the grip sensor module 171 equipped on both sides of the terminal as the terminal is gripped, if a touch C1 whose coordinates are not included in the touch-inactive areas 163a-163c established adjacent to the grip areas 175a-175c are detected, it is determined that the touch C1 results from a normal touch input.

Figure 5E:
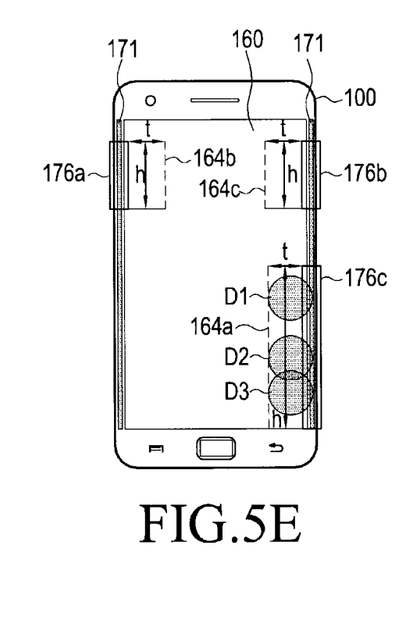

Referring to FIG. 5E, while grip areas 176a to 176c are detected from the grip sensor module 171 equipped on either side of the terminal as the terminal is gripped, if multi touch signals D1 to D3 whose coordinates are included in the touch-inactive areas 164a to 164c established adjacent to the grip areas 176a to 176c are detected, it is determined that the multi touch signals D1 to D3 result from a gripping gesture.

Figure 5F:
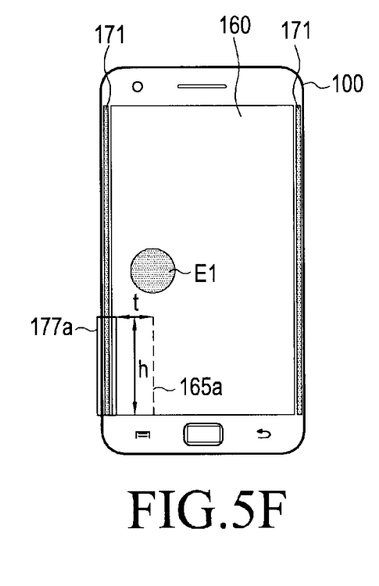

Referring to FIG. 5F, while the grip area 177a is detected from the grip sensor module 171 as the terminal is gripped, if a touch signal E1 whose coordinates are not included in the touch-inactive area 165a established adjacent to the grip area 177a is detected, it is determined that the touch signal E1 results from a normal input touch.

Figure 5G:
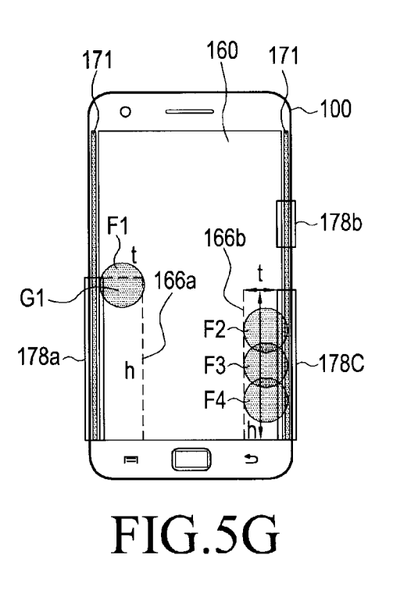

Referring to FIG. 5G, while grip areas 178a to 178c are detected from the grip sensor module 171, if multi touch signals F1 to F4 are detected, it is determined that the touch signals F1 whose coordinates are included in the touch-inactive area 166a established adjacent to the grip area 178a results from a gripping touch. The above-described "averaging approach" is used in this determination, where it is calculated that the average location of the overall touch area, e.g., center of gravity point G1 of the area of touch F1, is within the touch-inactive area 166a. It is also determined that the touch signals F2 to F4 whose coordinates are included in the touch-inactive area 166b established adjacent to the grip area 178c result from a gripping touch.

In FIGS. 4A to 5G, touch-inactive areas are assumed to be rectangular according to one illustrative embodiment. However, taking into account the user's various touch points in the touchscreen unit, the touch-inactive area for recognizing a gripping touch should be minimized while a touch-active area for recognizing a normal touch input should be secured to the greatest extent. Thus, the touch-inactive area may be established with other geometric shapes, e.g., oval, circular, fan-shaped, or finger-shaped to minimize the touch-inactive area.

For example, if the touch-inactive area is established to be finger-shaped, when the grip signal is detected from the grip sensor unit equipped on the left side of the touchscreen unit, the left hand's finger shape, in particular, the left hand's thumb shape may be established for the touch-inactive area. In this regard, a rectangular area may first be established having the vertical length h and the horizontal length t, and then the touch-inactive area may be established to have the left hand's thumb shape that may be contained to the greatest extent within the rectangular area.

Further, when the grip signal is detected from the grip sensor unit equipped on the right side of the touchscreen unit, the right hand's finger shape, in particular, the right hand's thumb shape may be established for the touch-inactive area. In this regard, a rectangular area may first be established having the vertical length h and the horizontal length t, and then the touch-inactive area may be established to have the right hand's thumb shape that may be contained to the greatest extent within the rectangular area.

Embodiments of the present invention have an advantage of determining whether a touch that occurs on a touchscreen is a part of an unintentional gripping touch, or an intentional touch, while the terminal is turned on or being turned on. Embodiments have another advantage of preventing a gripping touch that may occur on a touchscreen from being mistaken for a touch terminals having a thin bezel (or no bezel) surrounding an outer frame of the touchscreen. In particular, the advantage may be apparent for flexible displays or transparent displays that have no outer frames or only minimal outer frames.

Certain embodiments of the present invention also adjustably adapt a touch-inactive area according to a range of a grip area. This affords an advantage of establishing a minimum touch-inactive area while securing maximum touch-active area, so as not to negatively impact functionality.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for controlling operations of a terminal, the apparatus comprising:
   a grip sensor unit configured to output a grip signal when the terminal is gripped;
   a touchscreen unit that receives touch input commands; and
   a controller configured to establish a touch-inactive area in the touchscreen unit upon detection of a touch signal while the grip signal is detected, and to determine that the touch signal generated in the touch-inactive area results from a gripping touch and that the touch signal not generated in the touch-inactive area results from the touch input commands,
   wherein the controller, upon detection of the touch signal received from the touchscreen unit while detecting a plurality of grip signals received from the grip sensor unit, detects a grip area where each of the grip signals has been generated, determines a vertical length h of each grip area, establishes a variable horizontal length t according to the vertical length h, establishes a touch-inactive area having the vertical length h and the horizontal length t in the touchscreen unit, and determines that a touch signal results from the gripping touch when coordinates of the touch signal are contained in the touch-inactive area,
   wherein when first and second grip signals are generated due to grip touches on spaced apart first and second grip areas on a common side of the terminal, first and second touch-inactive areas are generated adjacent to the first and second grip areas, respectively, the first and second touch-inactive areas each being of a rectangular shape and spaced apart from one another vertically, and each having a variable horizontal length determined according to a vertical length thereof.

2. The apparatus of claim 1, wherein the grip sensor unit provides the controller with the grip signal that includes information about a grip area when the terminal is gripped, the touch-inactive area being established adjacent to the grip area.

3. The apparatus of claim 1, wherein the controller, upon detection of the touch signal while detecting a plurality of grip signals, establishes a plurality of touch-inactive areas adjacent to respective grip areas in the touchscreen unit where the plurality of grip signals are generated.

4. The apparatus of claim 1, wherein the controller detects the grip area from information about the grip area, the information being included in the grip signal.

5. The apparatus of claim 1, wherein when coordinates of a touch signal are contained within an area other than the touch-inactive area, the touch signal is recognized as an executable touch input command.

6. The apparatus of claim 1, wherein the controller, upon detection of multi touch signals received from the touchscreen unit while detecting a grip signal received from the grip sensor unit, detects a grip area where the grip signal has been generated, determines a vertical length h of the grip area, establishes a variable horizontal length t according to the vertical length h, establishes a touch-inactive area having the vertical length h and the horizontal length t in the touchscreen unit, and when coordinates of the multi touch signals are contained in both the touch-inactive area and the area other than the touch-inactive area, determines that a touch signal having coordinates contained in the touch-inactive area results from the gripping touch.

7. The apparatus of claim 6, wherein the controller detects the grip area from information about the grip area, the information being included in the grip signal.

8. The apparatus of claim 6, wherein when coordinates of one of the detected multi touch signals are contained within an area other than the touch-inactive area, the touch signal for the one multi touch signal is recognized as an executable touch signal.

9. The apparatus of claim 6, wherein when coordinates of the detected multi touch signals are contained in the touch-inactive area, the touch signal is determined to result from a gripping touch, and when coordinates of the detected multi touch signals are contained in an area other than the touch-inactive area, the touch signal is recognized as an executable touch signal.

10. The apparatus of claim 1, wherein the touch-inactive area is first designated after a touch input is detected while the grip signal is present.

11. A method of controlling operations of a terminal including a grip sensor unit and a touchscreen unit that receives touch input commands, the method comprising:
- detecting first and second grip signals when the terminal is gripped;
- establishing first and second touch-inactive areas in the touchscreen area while the first and second grip signals are detected; and
- determining that a touch signal generated in one of the touch-inactive areas results from a gripping touch and that a touch signal not generated in one of the touch-inactive areas results from the touch input commands,
- wherein establishing first and second touch-inactive area comprises
  - detecting, upon detection of a touch signal received from the touchscreen unit while detecting the first and second grip signals received from the grip sensor unit, first and second grip areas where the first and second grip signals have been generated, respectively;
- wherein when the first and second grip signals are generated due to the first and second grip touches on spaced apart first and second grip areas on a common side of the terminal, first and second touch-inactive areas are generated adjacent to the first and second grip areas, respectively, the first and second touch-inactive areas each being of a rectangular shape and spaced apart from one another vertically, and each having a variable horizontal length determined according to a vertical length thereof.

12. The method of claim 11, wherein the grip signal includes information about a grip area when the terminal is gripped, the touch-inactive area being designated adjacent to the grip area.

13. The method of claim 11, wherein detecting a grip area comprises:
- detecting the grip area from information about the grip area, the information being included in the grip signal.

14. The method of claim 11, wherein establishing a touch-inactive area comprises:
- establishing, upon detection of the touch signal while a plurality of grip signals are detected, a plurality of touch-inactive areas adjacent to respective grip areas in the touchscreen unit where the plurality of grip signals are generated.

15. The method of claim 11, wherein designating comprises:
- determining that a touch signal results from the gripping touch when coordinates of the touch signal are contained in the touch-inactive area; and
- recognizing the touch input command as an executable touch, when coordinates of the touch are contained within an area other than the touch-inactive area.

16. The method of claim 11, wherein designating comprises:
- determining that a touch signal having coordinates contained in the touch-inactive area results from the gripping touch, when coordinates of detected multi touch signals are contained in both the touch-inactive area and an area other than the touch-inactive area.

17. The method of claim 16, further comprising:
- recognizing a touch signal as an executable touch signal when coordinates of the touch signal among the multi touch signals are contained within the area other than the touch-inactive area.

18. The method of claim 16, further comprising:
- determining, when the detected multi touch signals have coordinates in the touch-inactive area, that the touch signal results from the gripping touch; and
- recognizing, when the detected multi touch signals have coordinates in the area other than the touch-inactive area, the touch signal as an executable touch signal.

\* \* \* \* \*